United States Patent [19]
Bilanin et al.

[11] Patent Number: 6,042,059
[45] Date of Patent: Mar. 28, 2000

[54] SYSTEM AND METHOD OF VORTEX WAKE CONTROL USING VORTEX LEVERAGING

[75] Inventors: Alan J. Bilanin, Princeton; Todd R. Quackenbush, Pennington, both of N.J.

[73] Assignee: Continuum Dynamics, Inc., Princeton, N.J.

[21] Appl. No.: 09/027,104

[22] Filed: Feb. 20, 1998

Related U.S. Application Data
[60] Provisional application No. 60/038,286, Feb. 20, 1997.

[51] Int. Cl.$^7$ .................................................. B64C 23/06
[52] U.S. Cl. ........................ 244/199; 244/201; 244/204; 244/213; 244/91
[58] Field of Search ................................... 244/198, 201, 244/204, 205, 199, 200, 91, 45 R, 45 A, 213

[56] References Cited

U.S. PATENT DOCUMENTS

| | | | |
|---|---|---|---|
| 2,120,760 | 6/1938 | Lumiere | 244/91 |
| 2,740,596 | 4/1956 | Lee | 244/199 |
| 3,845,918 | 11/1974 | White, Jr. | 244/41 |
| 3,881,669 | 5/1975 | Lessen | 244/40 |
| 4,017,041 | 4/1977 | Nelson | 244/40 |
| 4,046,336 | 9/1977 | Tangler | 244/198 |
| 4,190,219 | 2/1980 | Hackett | 244/199 |
| 4,477,042 | 10/1984 | Griswold, II | 244/199 |
| 4,697,769 | 10/1987 | Blackwelder et al. | 244/199 |
| 5,209,438 | 5/1993 | Wynanski | 244/199 |
| 5,226,618 | 7/1993 | Greenhalgh | 244/213 |
| 5,492,289 | 2/1996 | Nosenchuck et al. | 244/204 |

FOREIGN PATENT DOCUMENTS

| | | | |
|---|---|---|---|
| 4-78793 | 3/1992 | Japan | 244/199 |
| 1436097 | 5/1976 | United Kingdom | 244/199 |
| 2 051 706 | 1/1981 | United Kingdom . | |

OTHER PUBLICATIONS

A.J. Bilanin et al., Aircraft Wake Dissipation by Sinusoidal Instability and Vortex Breakdown, American Institute of Aeronautics & Astronautics, 1973, pp. 1–11.

Delwin R. Croom et al., Low–Speed Wind–Tunnel Investigation of Span Load Alteration, Forward–Located Spoilers, and Splines as Trailing–Vortex–Hazard.

Alleviation Devices on a Transport Aircraft Model, National Aeronautics & Space Administration, 1975, pp. 2–46.

S.C. Crow, Stability Theory for a Pair of Trailing Vortices, American Institute of Aeronautics & Astronautics, vol. 8, No. 12, 1970, pp. 2172–2179.

V.R. Nikolie et al., Attenuation of Airplane Wake Vortices by Excitation of Far–Field Instability, American Institute of Aeronautics & Astronautics, Inc., vol. 93. No. 3511, 1993, pp. 876–884.

John N. Olsen et al., Aircraft Wake Turbulence and its Detection, Symposium on Aircraft Wake Turbulence, 1971, pp. 577–582.

Vernon J. Rossow, Prospects for Destructive Self–Induced Interactions in a Vortex Pair, American Institute of Aeronautics, and Astronautics Inc., vol. 24, No. 7, 1987, pp. 433–440.

Vernon J. Rossow, On the Wake Hazard Alleviation Associated With Roll Oscillations of Wake–Generating Aircraft, American Institute of Aeronautics & Astronautics, Inc., vol. 85, No. 1774, 1985.

*Primary Examiner*—Galen L. Barefoot
*Attorney, Agent, or Firm*—Woodbridge & Associates

[57] ABSTRACT

This invention relates to a system and method for reducing the primary vortex wake structure generated by a lifting body mounted on an object moving through a fluid. This is achieved by first, altering the generated initial vortex wake to make it vulnerable to rapid breakup; and, second, producing disturbances to this wake with secondary vortices from auxiliary lifting surfaces, called vortex leveraging tabs, to instigate this breakup. This invention relates to various fields of uses to include vortices generated by any type of lifting body moving through a fluid to include aircraft and watercraft, such as surface vessels and submarines.

47 Claims, 9 Drawing Sheets

SYSTEM AND METHOD OF VORTEX WAKE CONTROL USING VORTEX LEVERAGING

This application claims benefit of Provisional Application Serial No. 60/038,286 filed Feb. 20, 1997.

GOVERNMENT RIGHTS

This invention was made with Government support under Contract No. DAAH01-96-C-R253 awarded by the U.S. Army Missile Command, Redstone Arsenal, Alabama. The Government has certain rights in this invention.

BACKGROUND OF THE INVENTION

1. Field of the Invention

This invention relates to a system which employs vortex leveraging tabs to thereby reduce the hazard posed by the vortex wake of large aircraft to other aircraft flying nearby.

2. Description of Related Art

The wings of airplanes generate strong, concentrated vortices that trail from the area near their tips. These vortices generally arise from air spilling over the edges of each wingtip due to the difference in pressure on the upper and lower surfaces of the wing. In some cases, the wingtip vortices are fully formed (or "rolled up") immediately downstream of the trailing edge of the wing, while in other cases they form more gradually over a distance of one or more wingspans. The direction of rotation of these vortices when viewed from behind (downstream of) the wing are opposite one another, and the resulting "vortex pair" constitutes the most important feature of the vortex wake of the aircraft. In the absence of significant outside disturbances such as strong atmospheric turbulence, these vortex pairs often persist for several minutes, and this can pose a safety hazard to other aircraft. For example, a small airplane following close behind a larger one that generates a strong vortex pair (e.g, a commuter plane or small jet following a large jetliner) can in some cases be flipped over by the strong swirling flow of this pair. This vortex wake hazard is particularly serious for aircraft flying at low speeds and close together, and thus it is one of the principal constraints on the frequency with which jet transports can land at major airports.

The vortex pairs generated by airplane wings are in fact inherently unstable and eventually break up due to the growth of disturbances introduced directly or indirectly by atmospheric turbulence. The pair often breaks up into a series of coarse vortex rings and these rings are, in turn, susceptible to a further set of instabilities that continue in a cascade that ends with the vortex wake dissipating into the background flow over a period of several minutes. While the eventual wake breakup is effectively guaranteed, it is often unacceptably slow from the point of view of enabling commercial jet transports to fly safely close together when on approach to airports, and thus they often cannot land with sufficient frequency to avoid air traffic delays. Hence, the development of methods to accelerate the breakup of the vortex pairs trailed by aircraft wings is of considerable practical importance.

The prior art includes both studies in the technical literature that provide basic descriptions of vortex wake behavior (See, for example, S. C. Crow, "Stability Theory for a Pair of Trailing Vortices," *AIAA Paper No.* 70-53, January 1970 and V. R. Nikolic and E. J. Jumper, "Attenuation of Airplane Wake Vortices by Excitation of Far-Field Instability," AIAA Paper No. 93-3511, AIAA Applied Aerodynamics Conference, pp. 876–884, 1993) as well as several aircraft operational concepts directed at addressing the problem of wake hazard by weakening or diffusing the individual wingtip vortices (e.g., S. C. Crow, Panel Discussion in *Aircraft Wake Turbulence and Its Detection,* J. H. Olsen, ed., Plenum Press, New York, p.377 ff., 1971: D. Croom and R. E. Dunham, "Low Speed Wind Tunnel Investigation of Span Load Alteration, Forward Located Spoilers, and Splines as Trailing Vortex Hazard Alleviation Devices," *NASA TN D*-8133, 1975; and H. F. Faery, and J. F. Marchman, "Effect of Whitcomb Winglets and Other Wingtip Modifications on Wake Vortices," *Proc. of the Aircraft Wake Vortices Conference,* J. N. Hallock, ed., Report No. FAA-RD-77-68, pp. 207 –216, June 1977). In assessing this literature, it is important to realize that the hazard posed to other aircraft by the vortex wake is best measured by the torque or moment that is imposed on following aircraft by the persistence of organized vortices with strongly swirling flow. The torque or moment exerted by the vortices is an integrated property whose influence is summed up from contributions from velocities induced along the full span of the wing of the following aircraft. An effective wake mitigation method or device must break up the organized vortical flow in the vortex, reducing it to eddies whose scale is small compared to typical aircraft wings. It is not adequate to simply reduce the peak velocity inside the vortex (See for example, A. J. Bilanin and S. E. Widnall, "Aircraft Wake Dissipation by Sinusoidal Instability and Vortex Breakdown," AIAA Paper No. 73-107, January 1973; V. J. Rossow, "On the Wake Hazard Alleviation Associated with Roll Oscillations of Wake-Generating Aircraft," AIAA Paper No. 85-1774, AIAA 12th Atmospheric Flight Mechanics Conference, pp. 78–88, 1985; and V. J. Rossow, "Prospects for Destructive Self-Induced Interactions in a Vortex Pair," *Journal of Aircraft,* Vol.24, No.7, pp.433–440, July 1987).

The prior art also includes several inventions that have attempted to deal with the problem of vortex wake mitigation. U.S. Pat. No. 3,845,918 to Richard P. White, Jr. describes an additional surface mounted on the tips of a wing or hydrofoil that is aligned with the free stream and occupies 0.3 to 0.6 of the tip chord, from roughly mid-chord of the tip to the trailing edge. The purpose of this fixed surface—in combination with the effect of the rolling-up tip vortex—is to produce an alteration in the flow near the tip of the wing that yields a stall angle of attack relative to the additional surface and that dissipates the strength of the vortex. This is one example of a device that decreases the peak level of swirling velocity in the vortex immediately downstream of the wingtip, but which does not significantly reduce the overall strength of the vortex.

U.S. Pat. No. 4,477,042 to Roger W. Griswold, II describes contouring of the wingtip shape to thereby smooth the merging of flow between the upper and lower surfaces of the wing. The primary aim of this invention is alleviate the wake of a lifting wing, though a secondary goal is improving wing efficiency by decreasing the drag generated by the wing. An additional feature of this invention is a related concept involving the closure of gaps between partial span flaps. This also smoothes the flow around the edges of flap segments, weakening the vortices trailed from exposed edges of the flaps in a manner similar to the effect produced on the vortices trailed from wingtips. U.K. Patent 2,051,706 issued to British Aerospace describes a similar invention where an array of vane-type devices are proposed for the diminution of vortices generated by segmented flaps.

U.S. Pat. No. 4,190,219 to James E. Hackett details a vertical lifting surface, swept slightly aft, mounted downstream of the trailing edge of the tip of a lifting wing. The stated intent of this and related inventions is to preclude the formation of a distinct trailing vortex, shedding instead weaker discrete vortices that produce less kinetic energy in the wake and induce less drag on the generating wing by virtue of the reduced swirling velocity. Hackett relies on a single tip-mounted vane to accomplish this, while U.S. Pat. No. 4,017,041 to Wilbur C. Nelson describes an invention consisting of multiple retractable foils with the same object.

U.S. Pat. No. 4,046,336 to James L. Tangler describes the use of a fixed sub-wing attached to the tip of a lifting wing or rotor blade. This sub-wing is designed to divide the vorticity generated at the tip of the lifting surface so that two vortices are formed with a separation of 25% to 50% of the chord of the wing or blade. The interaction of the vortex generated by the sub-wing and that originating from the trailing edge of the wing or blade itself has the effect of diffusing the resultant vortex that forms from the amalgamation of these two, yielding lower swirl velocities.

U.S. Pat. No. 5,492,289 to Daniel M. Nosenschuck et al. describes a general method for shaping a lifting body to produce reduced strength trailing vortices. The preferred embodiment is a lifting wing with perturbations imposed on its trailing edge to produce the desired reduction in vortex strength. U.S. Pat. No. 4,697,769 to Ron F. Blackwelder et al. describes a method for achieving a similar result for the particular case where strong vorticity is generated at the leading edge of wings from the presence of flow separation (for example, delta wings at high angle of attack). This invention identified several different ways to use unsteady, periodic disturbances to increase or decrease the lift on such wings, thus implying a way to change the strength of vortices trailed into the wake. However, wings that generate vortices at the leading edge are a small subset of all aircraft, and, hence, this is not a method that is generally applicable to conventional aircraft configurations.

Other examples of prior art include the use of active flow control to induce hydrodynamic instabilities in individual vortices. U.S. Pat. No. 3,881,669 issued to Martin Lessen describes the use of devices that inject high velocity air into the central "core" region of a vortex in a way that instigates breakup of the core structure of individual vortices. This method involves introducing a flow of air through a small nozzle at or near the wingtip into the core of a trailing vortex in a direction that is collinear and coaxial with the vortex, and with a momentum flux of sufficient magnitude to render the vortex hydrodynamically unstable. Flow control devices of this kind are generally difficult to implement, requiring significant additional mechanisms to add the desired mass flow and being sensitive to the position of the introduction of the flow.

The prior art in this area thus consists primarily of techniques for weakening the tip vortices, often by amounts that produce significant performance improvements in terms of the drag induced on a wing by the wake but which do not significantly mitigate wake vortex hazard. Again, the crucial circumstance that drives this result is that devices designed primarily to weaken or diffuse a vortex chiefly only diminish the swirl velocity near the central axis or "core" of the vortices, doing little to reduce the overall circulation strength of the vortex. Though such devices can diminish the peak velocities encountered downstream, the net rolling moment experienced by a following aircraft is much less strongly affected since this rolling moment is an integrated quantity distributed over the full span of the following aircraft. This result is evident in the indifferent success of devices in flight tests described in the technical literature, many of which produce well-diffused vortices but which do little to reduce the total moment on trailing aircraft. None of these inventions have proved to be so effective as to be put into practice.

A much more appropriate and attractive method for reducing vortex hazard is the acceleration of the instabilities in the wake arising from the mutual interaction of vortices in the wake. Such interactions are in general the actual mechanism that dissipates the wake when appropriately excited by atmospheric turbulence, and a logical method for accelerating this process is to employ an active mechanical system for exciting the most unstable modes of motion in the wake. Prior technical publications have described methods for exciting the Crow instability of the single vortex pair (e.g., both S. C. Crow articles, Supra). These include introducing time-varying control inputs to the aircraft to cause it to bob up and down or roll laterally at frequencies characteristic of Crow instability (typically, the time for the aircraft to traverse approximately eight wingspans of distance) (ref. A. J. Bilanin and S. E. Widnall article, Supra). This approach can be effective in instigating the Crow instability, but is very uncomfortable for passengers and requires large (of the order of 10 percent) changes in the mean lift of the aircraft, which can produce very large stresses on the wing roots. An appropriate solution for the wake mitigation problem would involve a method that does not require or cause large variations in mean loading on the existing aerodynamic surfaces.

SUMMARY OF THE INVENTION

The vortex leveraging system of the present invention seeks to overcome the limitations of the prior art by providing a method for more rapidly breaking up the trailing vortex pair or pairs generated by the primary wing of an aircraft and thereby mitigating the hazard posed by the interaction of this wake with following aircraft. It is implemented by first setting up a vortex wake structure consisting of two or more pairs that is particularly susceptible to rapid breakup. This is accomplished either by altering the vortex wake of the primary wing by redistributing the aerodynamic load along the span of the wing or incorporating the vortex wake of the horizontal tail. The breakup itself is enhanced by introducing time-varying disturbances from small aerodynamic surfaces to thereby excite the instabilities associated with this multiple-pair wake. The goal of the excitation is to produce a time-varying motion in the position of the centroid of vorticity of one or more vortex pairs at particular frequencies to start a process that leads to rapid breakup. Excitation of the position of the centroid of vorticity of the inboard vortex pair is particularly effective for a two-pair vortex wake.

The excitation involves introducing relatively weak "secondary" vortices (whose strength is a small fraction—approximately 5 to 10 percent—of the "primary" vortices trailed from the wingtips or wing-flap junctions) that are generated by special control surfaces called vortex leveraging tabs or VLTs. In general, VLTs are themselves small "wings" that generate their own tip vortices. The VLTs can be mounted on or near the main wing or the horizontal tail and the strength of the secondary "leveraging" vortices they generate is varied in time at carefully selected frequencies. These frequencies are chosen to maximize the system's effect on rapidly building up the instabilities of the multiple-pair wake and thereby more rapidly breaking up the entire vortex wake structure.

As will be noted in the discussion below, there are a variety of embodiments that, while different in detail, all fall within the scope of this invention. The invention may be more fully understood by reference to the following drawings.

DESCRIPTION OF THE INVENTION

During the course of this description, like numbers will be used to identify like elements according to different views which illustrate the invention.

Figure 1:
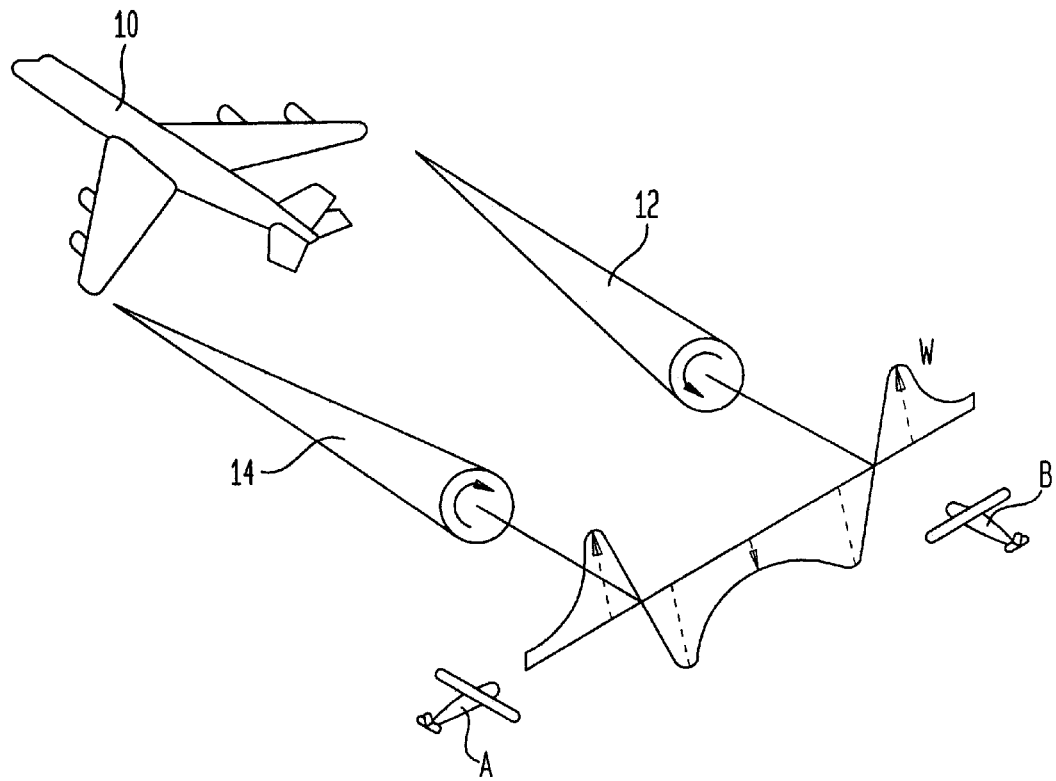
FIG. 1 is a schematic depiction of the tip vortices generated by a large civil jetliner and of the vertical velocity field W they generate, along with a suggestion of the interaction of this vortex wake with other nearby aircraft, here designated A and B.
Figure 2:
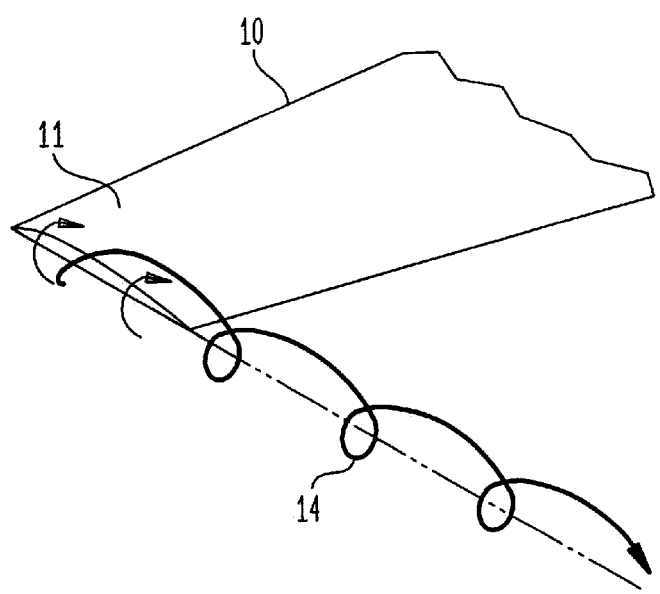
FIG. 2 is a schematic depiction of the generation of a wingtip vortex on a lifting wing.

The goal of the present invention is to rapidly dissipate the vortex wake of a typical aircraft like that depicted in FIG. 1 in which the primary wing 10 of the aircraft generates tip vortices 12 and 14. The sense of rotation of the vortices 12 and 14 are opposite one another, and their strength is such that they generate large, highly variable vertical velocities W (also referred to as "upwash" or "downwash" depending on the particular direction of flow at a given location) that can cause aircraft nearby (such as those labeled A and B in FIG. 1) to be flipped over. The tip vortices themselves originate from strongly swirling flows of air that arise from the difference in pressure on the upper surface 11 and the lower surface of the primary wing, as shown in FIG. 2. Dissipation of the wake is achieved when the organized vortices have been broken up into unorganized clumps whose characteristic size is small compared to the span of the wing 10.

The term "leveraging" in the title of this invention comes from the use of vortices generated by small aerodynamic surfaces (the VLTs) to greatly accelerate instabilities that rapidly break up the vortex wake of a much larger lifting wing. As outlined above, the vortex leveraging system involves two principal elements. First, it specifies that the vortex wake of an aircraft should consist of a multiple-pair structure that is vulnerable to being rapidly broken up and, moreover, what the strength and relative initial location of these vortex pairs should be. Second, it specifies how the strength and location of the secondary leveraging vortices should be varied in time such that will they will successfully initiate a rapid breakup process. The leveraging vortices must be of a certain minimum strength and must have their strength varied at a particular frequency or combination of frequencies to be effective. The two-pair vortex wake discussed below is an example of the class of multiple-pair wakes encompassed by the vortex leveraging invention.

Figure 3:
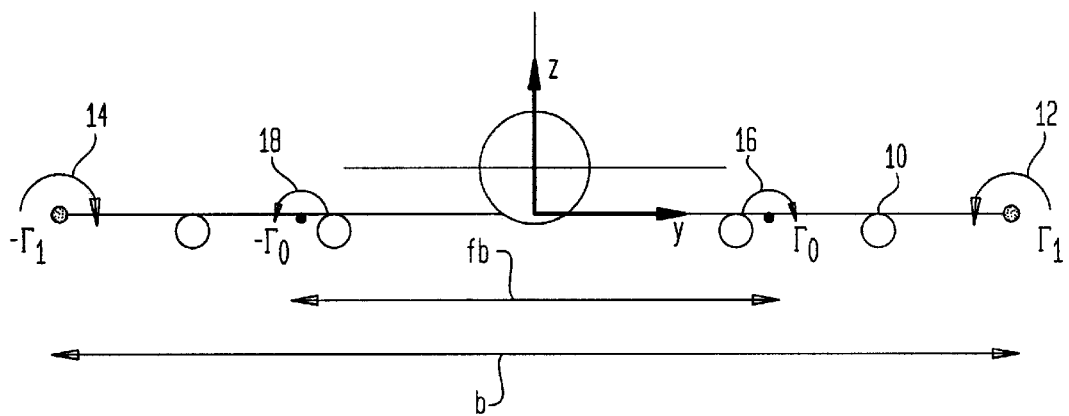
FIG. 3 is a schematic rear view of the vortex system trailing from the primary wing of an aircraft showing the initial two pair vortex wake structure, one embodiment of the present invention.

To quantify the appropriate location and strength of inner vortices, note FIG. 3 in which the vortex span ratio, f, and the ratio of the vortex strengths, $S = -\Gamma_0/\Gamma_1$, are defined For convenience, a vortex with a counterclockwise sense of rotation when viewed from downstream of the aircraft is considered positive, while a clockwise sense of rotation is considered negative. One possible embodiment of this invention involves a particular relationship f and S that yields a two-pair vortex wake referred to as the "uniform descent" case. This "uniform descent" relationship is defined by:

$$S = \frac{f(3+f^2)}{(1+3f^2)}$$

Figure 4:
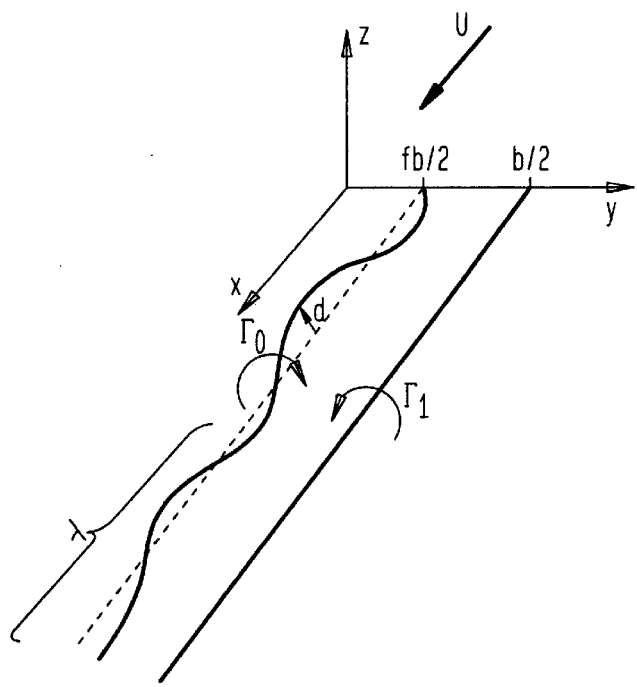
FIG. 4 is a schematic depiction of the introduction of disturbances onto an inboard vortex of the two-pair vortex wake.
Figure 5:
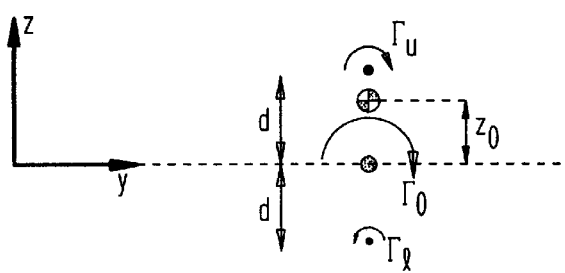
FIG. 5 is a schematic of a rear view of the inboard vortex perturbed by the introduction of weaker vortices above ($\Gamma_u$) and below ($\Gamma_l$) and the resulting displacement of the centroid of this multivortex system, $\Gamma_0$ where for this particular case, $\Gamma_0 = 2\Gamma_u = 4\Gamma_l$.
Figure 6A:
FIGS. 6a, 6b, and 6c depict the two-pair wake at, respectively, 6, 30, and 60 sec. after aircraft passage.
Figure 6B:
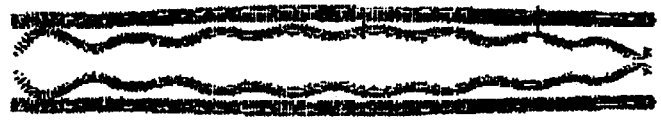
Figure 6C:
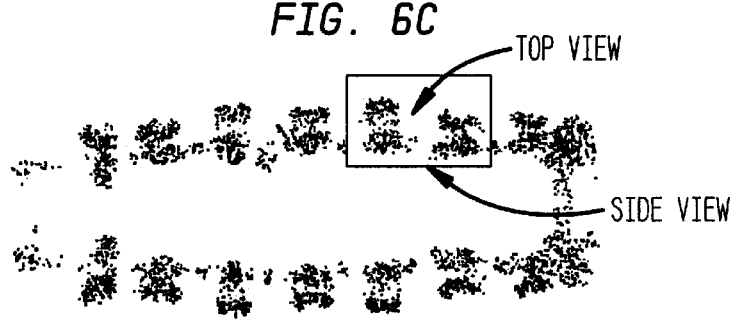
Figure 6D:
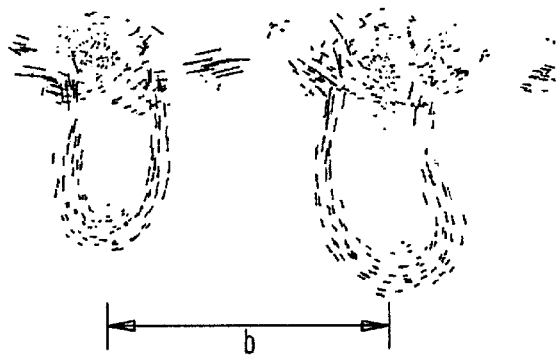
FIGS. 6d and 6e show the top and side views, respectively, of a small portion of the wake structure at 60 sec.
Figure 6E:
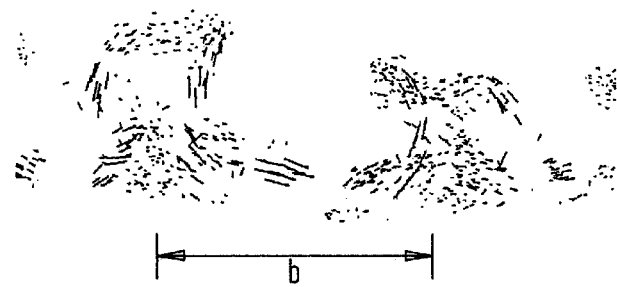

For this case, it has been discovered that to induce rapid wake breakup, it is desirable to introduce vertical perturbations into the position of the centroids of the inner vortices 16, 18 of the form:

$$\Delta z_0 = d\, \sin(2\pi x/\lambda)$$

where x is the downstream distance and d is the magnitude of the perturbation (typically 0.01b to 0.03b), as shown in FIG. 4. To support interpretation of FIG. 4 as well as subsequent discussion, FIG. 5 shows a schematic depicting the location of the centroid of a set of vortices composed of the inboard vortex $\Gamma_0$ along with two weaker vortices $\Gamma_u$ and $\Gamma_l$. A wavelength $\lambda$ of $8b_v$ has proved to be a successful choice for accelerating wake breakup for this "uniform descent" case, where $b_v=0.78b$ is a reference distance corresponding to the width of the vortex wake far downstream of an elliptically loaded wing. The frequency of variation corresponding to this wavelength is $8b_v/U$, where U is the forward velocity of the aircraft.

Another more general vortex leveraging strategy can also be used. It has been discovered that for values of S between 0.3 and 0.5, choosing f to be equal to the absolute value of S defines a desirable relationship for the spacing and strength of inboard and tip vortices to enable rapid breakup. Moreover, for this more general "non-uniform descent" class of cases, it is desirable to use higher frequencies of time variation in the position of the centroid $z_0$ which corresponding to shorter wavelength disturbances in the inner vortices. In particular, frequencies approximately four times as high as those used in the "uniform descent" case are desirable, corresponding to wavelengths of $2b_v/U$. This more general vortex leveraging strategy in fact leads to superior performance in terms of wake breakup and thus is a feature of the preferred embodiment of this invention discussed in more detail below. FIG. 6 shows the computed behavior of the vortex wake of an aircraft with the application of the vortex leveraging strategy, indicating the nature of the breakup in the vortex wake that occurs with leveraging applied and illustrating the desired results of generating small scale puffs in the wake.

There are several possible embodiments of this invention. Consider an aircraft whose primary wing 10 is carrying a lifting force in the positive z direction as defined in FIG. 3. Wing 10 trails tip vortices 12 and 14 both with strength $\Gamma_1$ and the sense of rotation depicted in FIG. 3 (i.e., tip vortex 12 taken to rotate in the positive or counterclockwise direction). The distribution of lift across the span of the wing 10 is such that an inboard vortex pair of vortices 16 and 18 are trailed from a spanwise locations at a distance $y=fb/2$ and $y=-fb/2$ from the aircraft centerline, respectively. The sense of rotation of the inboard vortex 16 is opposite that of the tip vortex 12, while the sense of rotation of the inboard vortex 18 is opposite that of the tip vortex 14. The strength of the inboard vortex 16 is $-\Gamma_0$ and that of inboard vortex 18 is $\Gamma_0$.

Figure 7:
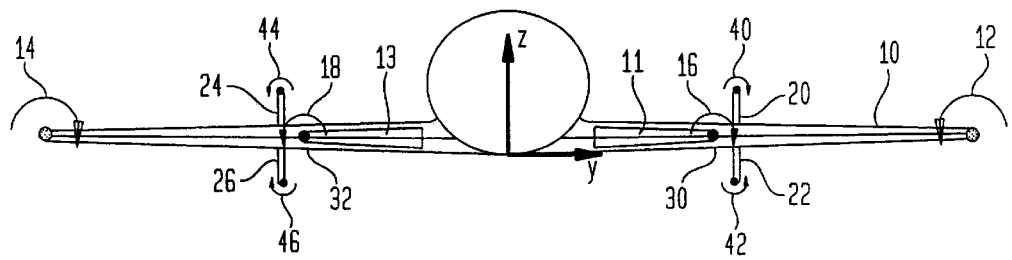
FIG. 7 is a rear elevation view of one possible installation of vortex leveraging tabs on the primary wing of an aircraft.
Figure 8A:
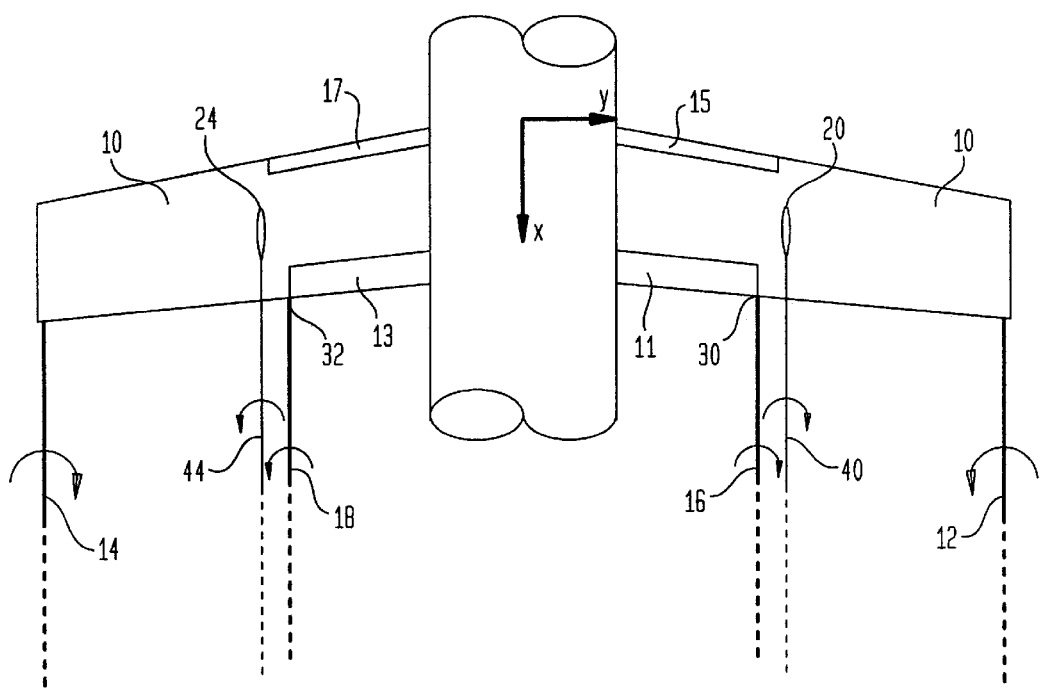
FIG. 8a is a plan view of one possible installation of vortex leveraging tabs on the primary wing of an aircraft.
Figure 8B:
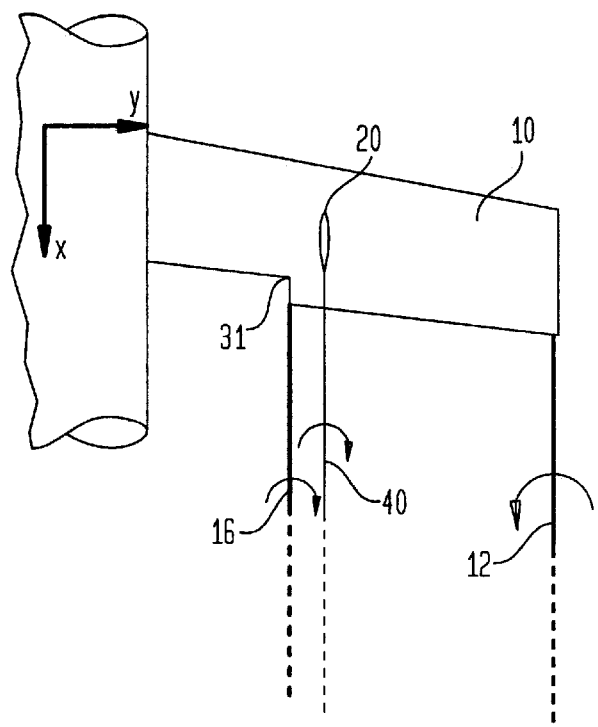
FIG. 8b depicts a plan view of an alternative wing geometry with the inboard vortex generated by a discontinuity in chord.
Figure 8C:
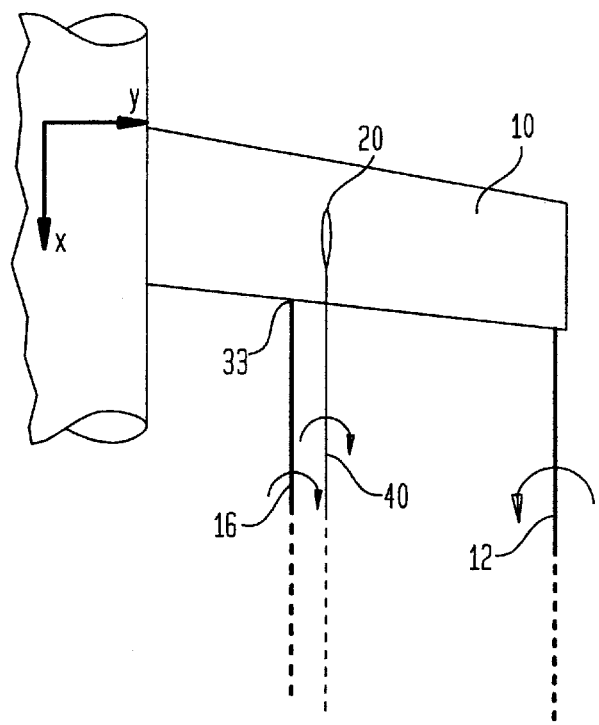
FIG. 8c depicts a plan view of an alternative wing geometry with the inboard vortex generated by a discontinuity in the geometric angle of attack (or twist) of the wing (not shown).

In embodiment 10, one possible embodiment of this invention, the ratio S has a value between 0.3 and 0.5, as described just above. The position of origin of the inboard vortices is such that f is equal to the absolute magnitude of S. Small wings denoted vortex leveraging tabs 20, 22, 24, and 26 are mounted vertically on the primary wing 10 as shown in FIG. 7. As shown in FIG. 8a, they are located forward of the trailing edge of the wing and near the y positions 30 and 32 from which the inboard vortices 16 and 18 are trailed, respectively. The tabs 20, 22, 24, and 26 are positioned and aligned with respect the onset flow U so that the vortices trailed from them their tips are amalgamated in the formation of the inboard vortices 16 and 18. The offset of the tabs in the y direction from the locations 30 and 32 of the origin of the inboard vortex should be no greater than the height of the tabs. FIGS. 8b and 8c show plan views for alternative geometries of the primary wing in which the inboard vortex 16 arises, respectively, from a discontinuity in chord at spanwise location 31 or a discontinuity in the geometric angle of attack (or twist) of the wing at spanwise location 33.

The tabs may be disposed in pairs as shown in FIG. 7, one each on the upper surface, and lower surface of the wing; the tabs may also be installed singly, one each on the upper or lower surface, but in this case the size of the tabs required to achieve a particular motion in the inboard vortex centroid increases. In the case where tabs are disposed in pairs as shown in FIG. 7, the tabs on either wing are identical in size, in location relative to the trailing edge, and y position. The strength and sense of rotation of the control vortices 40, 42, 44, and 46 trailed by the tabs are such that their amalgamation with the inboard vortices 16 and 18 produces a vertical perturbation in position of centroid of the resulting amalgamated vortices of between 0.01 and 0.03 times the span of the wing b.

Figure 9:
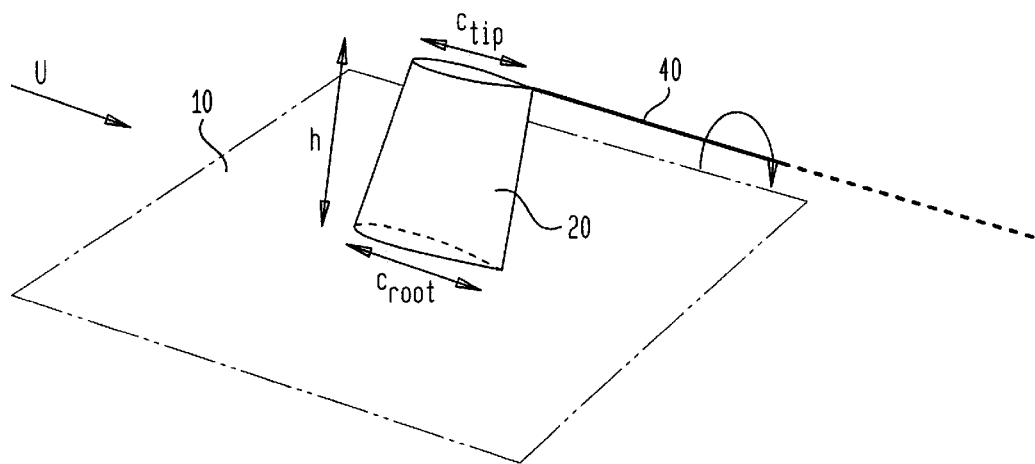
FIG. 9 is a left side elevation of the geometry of one of the vortex leveraging tabs installed on the top surface of the right wing of the aircraft.

Referencing FIG. 9, for the embodiment shown here, the tabs 20, 22, 24, and 26 are lifting surfaces of approximately rectangular shape, with the ratio of their height h to their mean chord $\frac{1}{2}(c_{root}+c_{tip})$ (i.e., their aspect ratio) being not less than 1 and not greater than 3. The largest dimension is that of the tab height above the wing surface as shown in FIG. 9. The height h of the tabs should be approximately equal to the desired magnitude d of the perturbation in inboard vortex position. Those skilled in the art will be aware of other methods for achieving the necessary time-varying perturbation in the vortex position to meet the specifications of this invention.

Figure 10A:
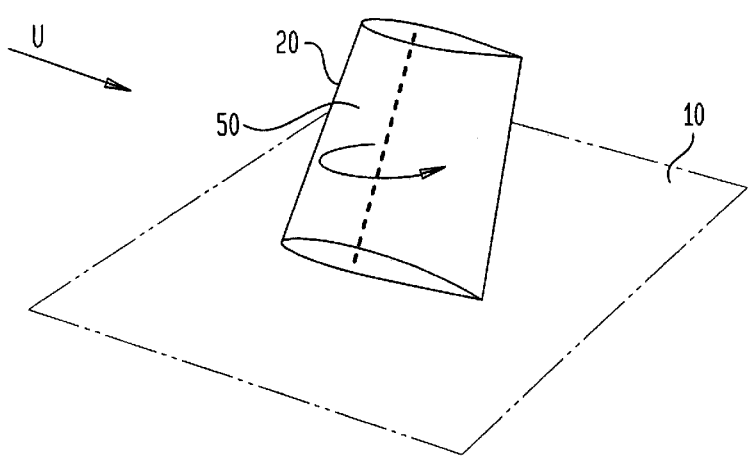
FIGS. 10a and 10b are the side/oblique view and the top view, respectively, of a means for controlling the side force on a vortex leveraging tab by rotating the entire surface to an angle of attack with respect to the oncoming flow.
Figure 10B:
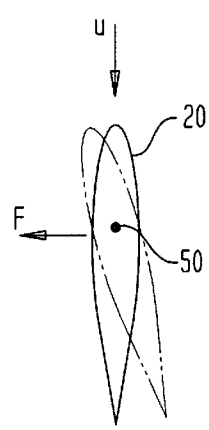
Figure 11A:
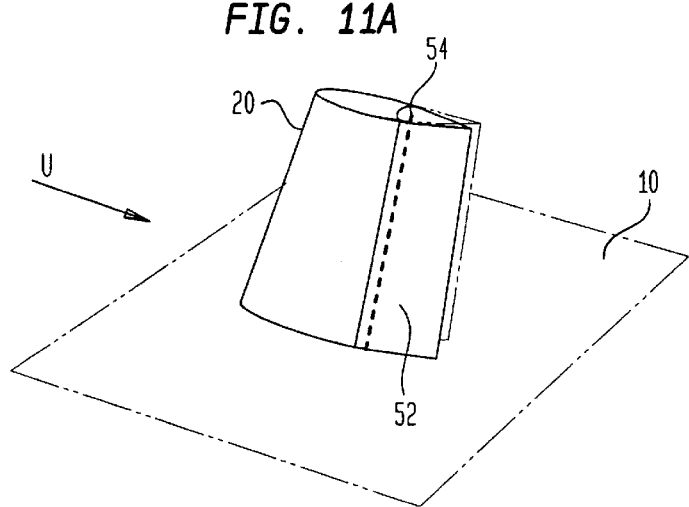
FIGS. 11a and 11b are the side/oblique view and the top view, respectively, of a means for controlling the side force on a vortex leveraging tab by deflecting a trailing edge flap.
Figure 11B:
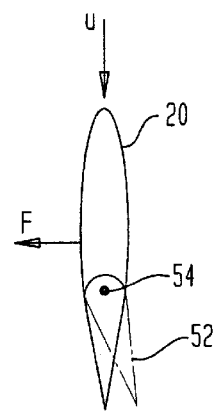
Figure 12A:
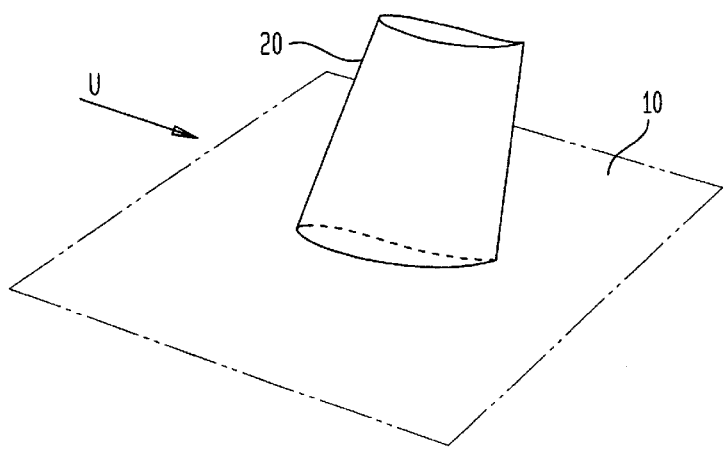
FIGS. 12a and 12b are the side/oblique view and the top view, respectively, of a means for controlling the side force on a vortex leveraging tab by deforming the trailing edge of the tab.
Figure 12B:
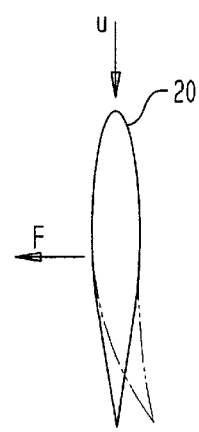

The force F on the tabs that causes the control vortices 40, 42, 44, and 46 to be produced is directed in the +/− y direction, and so has very little direct effect on the lift force generated by the primary wing 10. The force on the vortex leveraging tabs in one alternative embodiment 12 arises from the deflection of the entire tab about an axis 50 perpendicular to the primary wing, thus placing the surface at an angle of attack to the onset flow as depicted in FIGS. 10a and 10b. An alternative embodiment 14 has the force resulting from the deflection of a trailing edge flap 52 comprising the rear portion of the tabs about an axis 54 perpendicular to the primary wing as depicted in FIGS. 11a and 11b. In yet another alternative embodiment 16, the side force may be produced from the deformation of the cross-section of the tab to alter its camber and thus its effective angle of attack with respect to the onset flow as depicted in FIGS. 12a and 12b. In yet still another embodiment 18, the force may arise from the action of flow control devices such as slots allowing blowing of air located near the trailing edge of the tab 20. Those skilled in the art will be aware of many possible methods for achieving the necessary side force F on these tabs to meet the specifications of this invention.

The side force F on the tabs 20, 22, 24, and 26 should be varied as a function of time t as $F(t)=F_{max}\sin(2\pi t/P+\phi)$, t being the time elapsed from an arbitrary reference time, P being the period for the aircraft traveling at a velocity U to traverse twice the distance $b_v$ (or $P=2b_v/U$), the phase angle $\phi$ being at a distinct value for each of the tabs, and $F_{max}$ being the maximum value of side force applied to the tabs. The phase angle $\phi$ for tab 20 should be such that the strength of the vortex 40 is equal in magnitude yet opposite in sign to the vortex 42 generated by the tab 22: similarly, the phase angle $\phi$ for tab 24 should be such that the strength of the vortex 44 is equal in magnitude yet opposite in sigh to the vortex 46 generated by the tab 26. Thus, the magnitude of the force F on the leveraging tabs mounted on the upper surfaces of each wing are equal in magnitude and opposite in direction to each other, while it is equal in both direction and magnitude to their companion tabs on the lower surfaces of the wing.

Each of the embodiments 12, 14, 16 and 18 just described has assumed that the design of the primary wing 10 is such that the desired two-pair vortex system arises when the wing is placed at an angle of attack appropriate for steady flight at the velocity U. Alternative embodiments are possible where in embodiment 20, the strength of the inboard vortex pair 16 and 18 is controlled by the deflection of one or more trailing edge flaps located on the primary wing (e.g., 11 or 13 in FIG. 8*a*); or in embodiment 30, by the deployment of leading edge slats on the wing (e.g., 15 or 17 in FIG. 8*a*); or in embodiment 40 by a variation of the wing chord (FIG. 8*b*); or in embodiment 50 by a variation in wing twist (FIG. 8*c*); or in embodiment 60 by some combination of these. Those skilled in the art will be aware of methods for achieving this result.

Figure 13:
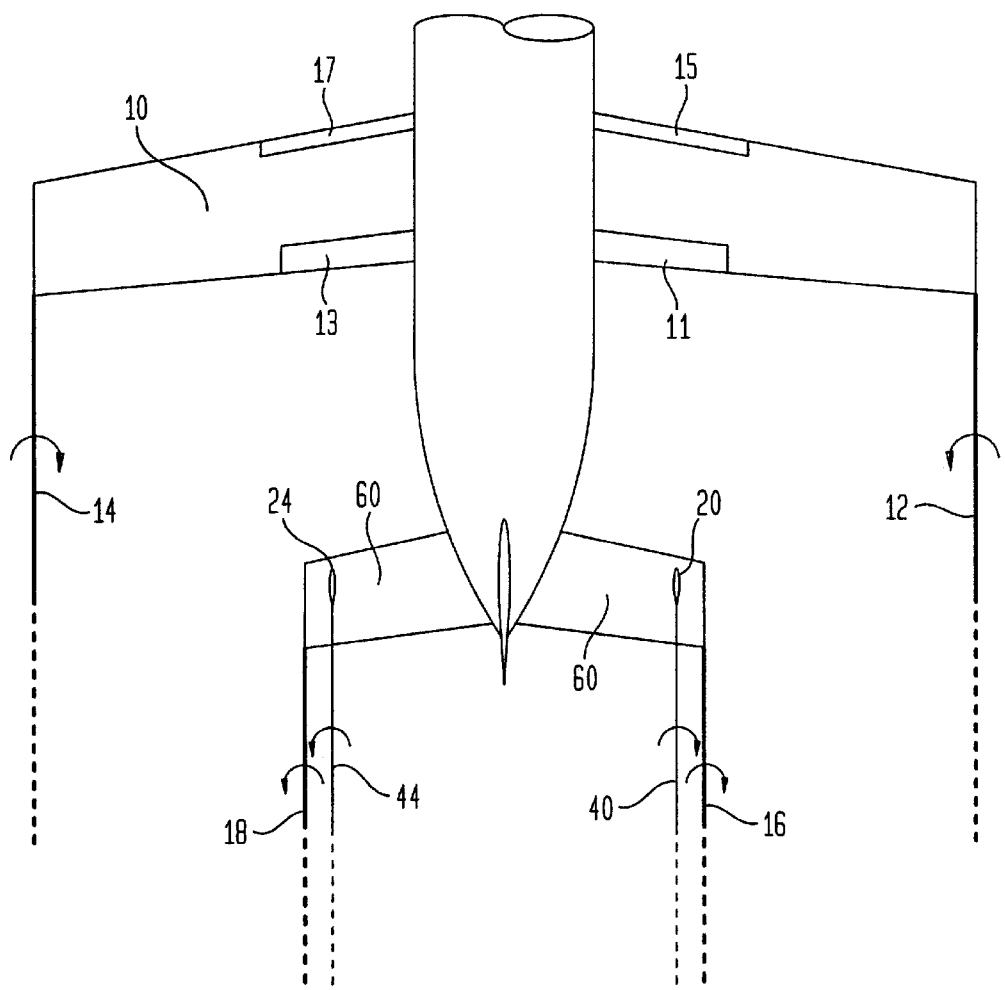
FIG. 13 is a top plan view of the installation of vortex leveraging tabs on the horizontal stabilizer of an aircraft according to the preferred embodiment of the invention.
Figure 14:
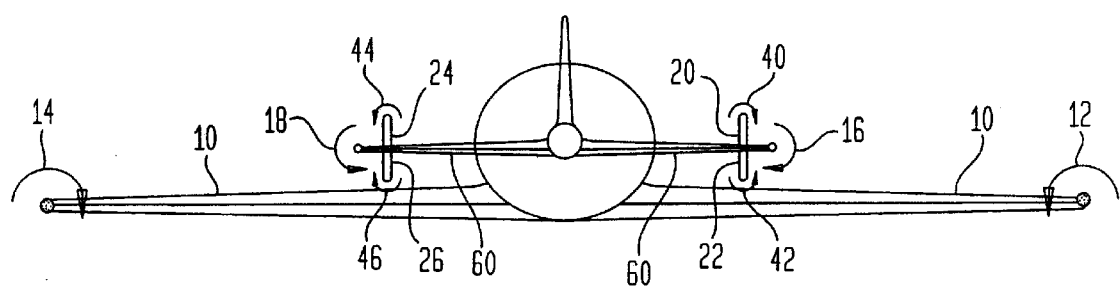
FIG. 14 is a rear elevation view of the installation of vortex leveraging tabs on the horizontal stabilizer of an aircraft according to the preferred embodiment of the invention as seen in FIG. 13.

Another class of embodiments 100 of this invention involves generating the inboard vortex pair 16, 18 from a second lifting surface located downstream of the primary wing 10. A particularly important example of this class, embodiment 110, involves the use of the horizontal stabilizer 60 of an aircraft to produce the inboard vortex pair (FIG. 13). In this case, the system described above is modified by locating the vortex leveraging tabs near the tips of the horizontal stabilizer, approximately at the 25% chord station and at a lateral distance from the stabilizer tip no greater than the height of the VLT (as shown in FIG. 14). The size of the vortex leveraging tabs and the required magnitude of the frequency and magnitude of their deflection all remain the same as those described for the embodiment involving wing-mounted VLTs. This is in fact the preferred embodiment of this invention, since the alterations required to existing aircraft designs is not as substantial as those related to using vortex leveraging tabs on the primary wing.

Figure 15:
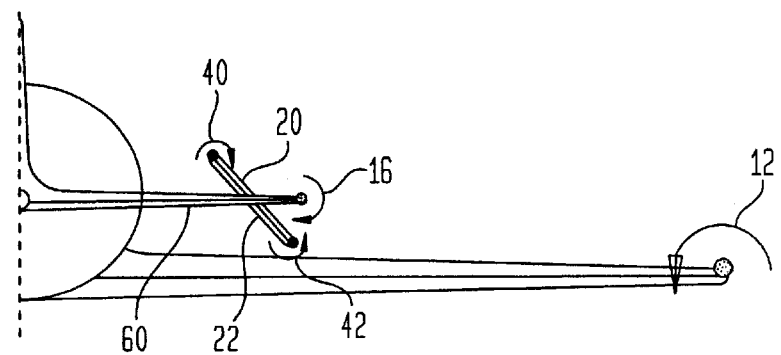
FIG. 15 is a rear elevation of the installation of vortex leveraging tabs on the horizontal stabilizer of the right side of an aircraft, with the tabs installed at an angle of 45 deg. to the vertical according to an alternative embodiment of the invention.
Figure 16:
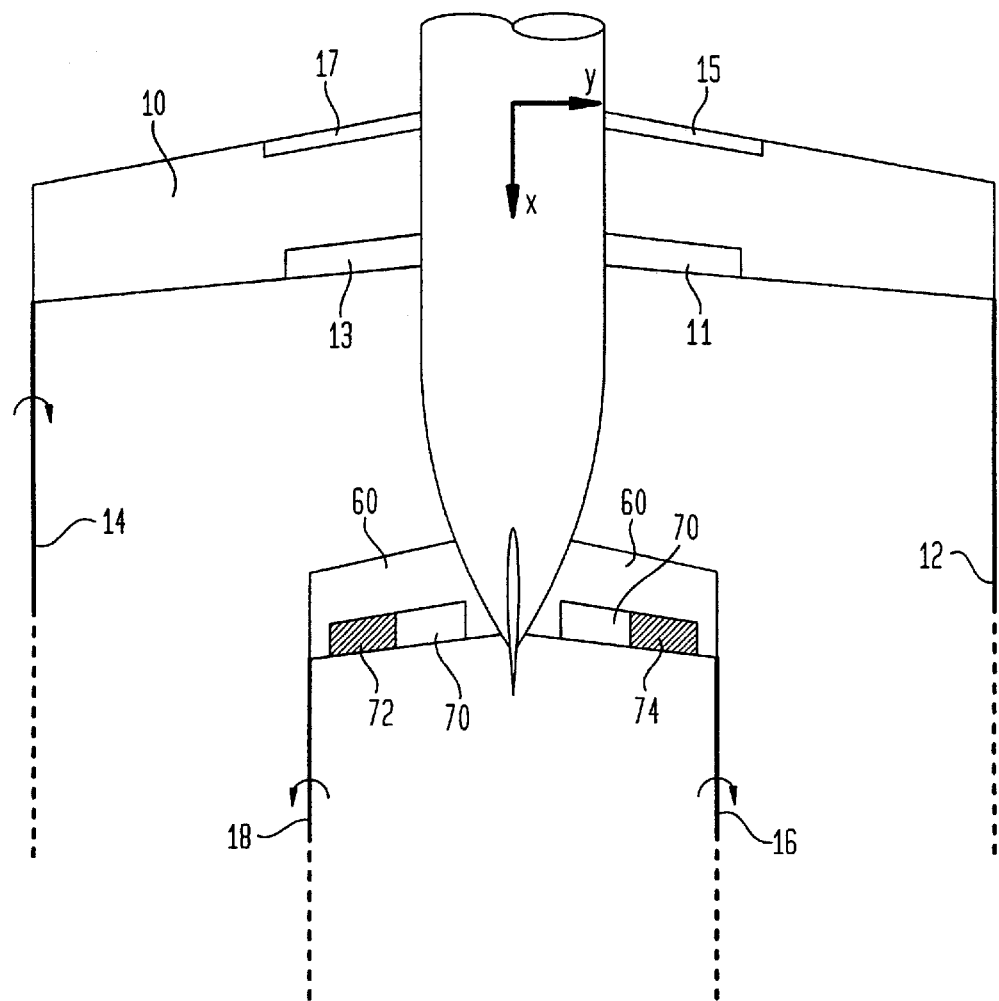
FIG. 16 is a plan view of the installation of vortex leveraging tabs embedded in the trailing edge of the horizontal stabilizer to produce lateral perturbations in the position of the inboard vortex pair according to an another alternative embodiment of the invention.

All of the specific embodiments described to this point, 10, 12, 14, 16, 18, 20, 30, 40, 50, 60 and 110, have assumed vertical (z direction) perturbations in the inboard vortex pair. Lateral (y direction) perturbations in the position of the inboard pair are also effective in instigating the wake breakup, as are combinations of lateral and vertical perturbations. An additional alternative embodiment 120 involves installing the vortex leveraging tabs at an inclination of 45 deg. to the vertical, with the tips of the tab on the top surface 40 of the horizontal stabilizer 60 inclined toward the aircraft centerline, and the tips of the tabs on the bottom surface 42 of the horizontal stabilizer inclined away from the aircraft centerline, as shown in FIG. 15.

Still another embodiment 130 involves the absence of distinct vortex leveraging tabs mounted on the surface, with them instead integrated into the trailing edge of the horizontal stabilizer, as part of or in addition to existing movable elevator surfaces. The perturbations in the position of the centroid of the inboard vortices that produce the wake breakup are in this case in the +/−y (lateral) direction and are introduced by oscillation of a vortex leveraging tab set 70 and 72 that is embedded within the trailing edge of the wing or the stabilizer. In either case, these tabs are oscillated at the frequency described above and the required perturbations in the lateral centroid position are in the same range as that described previously.

The dimensions and sizing for a typical VLT installation on a jet transport aircraft similar to a Boeing 757 conforming to the preferred embodiment described above would require each VLT surface mounted on the horizontal tail to be, at a minimum, 3.0 ft. high and 7.5 ft.$^2$ in total area. For an approach speed of 170 kts., this would require each VLT to generate a side force with $F_{max}$=750 lbs. and vary this force in a periodic fashion at a frequency of approximately 1 cycle/sec. For a larger aircraft such as the Boeing 747, the tab size would increase to, at a minimum, 5.0 ft. high and 21.0 ft.$^2$ in area, and requiring a force of magnitude $F_{max}$=2100 lbs. varied at a frequency of approximately 0.7 cycles/sec.

While the invention has been described with reference to the above alternative embodiments thereof, it will be appreciated by those of ordinary skill in the art that modifications can be made to the structure and elements of the invention without departing from the sprit and scope of the invention as a whole.

We claim:

1. A method for reducing the residual effects of a vortex wake structure generated by the primary wing of an aircraft in flight, said method comprising:
  (a) producing an additional wake structure having an inboard pair of vortices;
  (b) positioning on the aircraft auxiliary vortex leveraging tab surfaces (VLTs); and,
  (c) time-varying the effects of the VLTs to thereby introduce wake perturbations to facilitate rapid breakup of the residual effects of the vortex wake structure.

2. The method of claim 1 in which said time-varying step (c) comprises time varying deflection of the VLTs.

3. The method of claim 2 in which the deflection of the VLTs results in a side force, F, on each VLT, which force is applied as a function of time t:

$$F(t) = F_{max} \sin(2\pi t/P + \phi),$$

where t is the time elapsed from an arbitrary reference time,
  P is the period for the aircraft traveling at a velocity U to traverse twice the distance $b_v$,
  $b_v$=0.78 X the wingspan of the airplane,
  $\phi$ is a distinct phase angle for each of the VLTs, and
  $F_{max}$ is the maximum value of side force on the VLTs.

4. The method of claim 3 in which the perturbations occur at a predetermined frequency and amplitude.

5. The method of claim 4 in which the amplitude of the perturbations is within the range of 1.0% to 3.0% of the wingspan of the airplane.

6. The method of claim 5 in which the frequency of the perturbations is $8b_v/U$, where U is the velocity of the airplane and $b_v$=0.78 X the wingspan of the airplane.

7. The method of claim 5 in which the frequency of the perturbations is $2b_v/U$, where U is the velocity of the airplane and $b_v$=0.78 X the wingspan of the airplane.

8. The method of claim 7 in which the absolute value of the ratio, S, of the strength of a primary wing tip vortex to the strength of an inboard vortex, is equal to the ratio, f, of the wing span distance to the distance between the origins of the inboard pair of vortices.

9. The method of claim 8 in which $0.3 \leq S \leq 0.5$.

10. The method of claim 9 in which said positioning step (b) comprises situating each VLT at a distance no greater than the height of the VLT from the origin of the nearest inboard vortex.

11. The method claim 1 in which said producing step (a) comprises changing the lift distribution of the aircraft's primary wing.

12. The method of claim 1 in which said time-varying step (c) comprises time varying deformation of the VLTs.

13. The method of claim 1 in which said time-varying step (c) comprises flow control devices allowing blowing of air onto portions of the surface of the VLTs.

14. The method of claim 1 in which said producing step (a) comprises generating additional vortices from a surface other than the primary wing of the aircraft.

15. The method of claim 14 in which the additional vortices are generated from the horizontal stabilizer.

16. An apparatus for reducing the residual affects of a vortex wake structure generated by the primary wing of an aircraft in flight, said apparatus comprising:
    (a) vortex producing means for producing an additional wake structure having an inboard pair of vortices;
    (b) vortex leveraging tab surfaces (VLTs) positioned on the aircraft; and
    (c) time-varying means for time-varying the effects of the VLTs to thereby introduce wake perturbations to facilitate rapid breakup of the residual effects of the vortex wake structure.

17. The apparatus of claim 16 in which said time-varying means (c) comprises a means for deflecting the VLTs.

18. The apparatus of claim 17 in which said means for deflecting the VLTs comprises a means for applying a side force, F, on the VLTs as a function of time t:

$$F(t)=F_{max} \sin(2\pi t/P+\phi),$$

where t is the time elapsed from an arbitrary reference time,
    P is the period for the aircraft traveling at a velocity U to traverse twice the distance $b_v$,
    $b_v$=0.78 X the wingspan of the airplane,
    $\phi$ is a distinct phase angle for each of the VLTs, and
    $F_{max}$ is the maximum value of side force on the VLTs.

19. The apparatus of claim 18 in which the perturbations occur at a predetermined frequency and amplitude.

20. The apparatus of claim 19 in which the amplitude of the perturbations is within the range of 1.0% to 3.0% of the wingspan of the airplane.

21. The apparatus of claim 20 in which the frequency of the perturbations is $8b_v/U$, where U is the velocity of the airplane and $b_v$=0.78 X the wingspan of the airplane.

22. The apparatus of claim 20 in which the frequency of the perturbations is $2b_v/U$, where U is the velocity of the airplane and $b_v$=0.78 X the wingspan of the airplane.

23. The apparatus of claim 22 in which the absolute value of the ratio, S, of the strength of a primary wing tip vortex to the strength of an inboard vortex, is equal to the ratio, f, of the wing span distance to the distance between the origins of the inboard pair of vortices.

24. The apparatus of claim 23 in which $0.3 \leq S \leq 0.5$.

25. The apparatus of claim 24 in which each VLT is positioned at a distance no greater than the height of the VLT from the origin of the nearest inboard vortex.

26. The apparatus claim 16 in which said producing means (a) comprises changing the lift distribution of the aircraft's primary wing.

27. The apparatus of claim 16 in which said time-varying means (c) comprises time varying deformation of the VLTs.

28. The apparatus of claim 16 in which said time-varying means (c) comprises flow control devices allowing blowing of air onto the VLTs.

29. The apparatus of claim 16 in which said producing means (a) comprises generating additional vortices from a surface other than the primary wing of the aircraft.

30. The apparatus of claim 29 in which the additional vortices are generated from the horizontal stabilizer.

31. The apparatus of claim 16 in which the aspect ratio of each of the VLTs is not less than 1 and not greater than 3.

32. A method for reducing the residual effects of a vortex wake structure generated by an aircraft in flight, said method comprising:
    (a) positioning on the aircraft small auxiliary vortex leveraging tab surfaces (VLTs); and
    (b) time-varying the effects of the VLTs to thereby introduce wake perturbations to facilitate rapid breakup of the residual effects of the vortex wake structure.

33. An apparatus for reducing the residual effects of a vortex wake structure generated by an aircraft in flight, said apparatus comprising:
    (a) vortex leveraging tab surfaces (VLTs) located on the aircraft; and
    (b) time-varying means for time-varying the effects of the VLTs to thereby introduce wake perturbations to facilitate rapid breakup of the residual effects of the vortex wake structure.

34. A method of inducing a periodic hydraulic fluid pattern in an object's wake as the object moves through said fluid comprising:
    (a) positioning vortex leveraging tab surfaces (VLTs) on the object; and,
    (b) time-varying the orientation of the VLTs or portions thereof.

35. An apparatus for inducing a periodic hydraulic fluid pattern in an object's wake as the object moves through said fluid comprising:
    (a) vortex leveraging tab surfaces (VLTs); and,
    (b) time varying means for time-varying the orientation of the VLTs or portions thereof.

36. A method for reducing the residual effects of a primary vortex wake structure generated by a lifting body mounted on an object moving through a fluid, said method comprising the steps of:
    (a) producing an additional wake structure having an inboard pair of vortices;
    (b) positioning on the object auxiliary vortex leveraging tab surfaces (VLTs); and,
    (c) time-varying the effects of the VLTs to thereby introduce wake perturbations to facilitate rapid breakup of the residual effects of the primary vortex wake structure.

37. The method of claim 36 in which said time-varying step (c) comprises deflecting the VLTs to produce on each a lift, F, as a function of time t such that:

$$F(t)=F_{max} \sin(2\pi t/P+\phi),$$

where t is the time elasped from an arbitrary reference time,
    P is the period for said object traveling at a velocity U to traverse twice the distance $b_v$,
    $b_v$–0.78 X the span of the lifting body transverse to the direction of movement thereof through the fluid,
    $\phi$ is a distinct phase angle for each of the VLTs, and
    $F_{max}$ is the maximum value of lift on the VLTs.

38. The method of claim 37 wherein said perturbations occur at a predetermined frequency and amplitude, and wherein the amplitude of the perturbations is within the range of 1.0% to 3.0% of said span.

39. The method of claim 38 wherein the frequency of said perturbations is $2b_v/U$.

40. The method of claim 39 wherein the absolute value of the ratio, S, of the strength of said primary vortex to the strength of an inboard vortex, is equal to the ratio, f, of said span to the distance between the origins of the inboard pair of vortices, and wherein said ratio, S, is within the range $0.3 \leq S \leq 0.5$.

41. The method of claim 36 in which said producing step (a) comprises generating additional vortices from a surface other than the lifting body.

42. An apparatus for reducing the residual effects of a primary vortex wake structure generated by a first lifting body mounted on an object moving through a fluid, said apparatus comprising:
(a) vortex producing means for producing an additional wake structure having an inboard pair of vortices;
(b) vortex leveraging tab surfaces (VLTs) positioned on said object; and,
(c) time-varying means for time-varying the effects of the VLTs to thereby introduce wake perturbations to facilitate rapid breakup of the residual effects of the primary vortex wake structure.

43. The apparatus of claim 42 in which said vortex producing means (a) comprises a second lifting body mounted on said object, said second lifting body having a top surface and a bottom surface.

44. The apparatus of claim 43 wherein said VLTs are disposed on said second lifting body.

45. The apparatus of claim 44 in which said second lifting body comprises a first pair of VLTs at one transverse location on said second lifting body and a second pair of VLTs at another transverse location on said second lifting body, wherein one of said first pair of VLTs is located on said top surface of said second lifting body and the other of said first pair is located on said bottom surface of said second lifting body, and one of said second pair of VLTs is located on said top surface of said second lifting body and the other of said second pair of VLTs is located on said bottom surface of said second lifting body.

46. The apparatus of claim 45 in which each VLT is positioned at a distance no greater than the height of the VLT from the origin of the nearest inboard vortex.

47. The apparatus claim 42, in which said time varying means comprises means for deforming a cross-section of the VLTs to alter the camber thereof.

* * * * *